(12) United States Patent
Birloncea et al.

(10) Patent No.: US 8,136,121 B2
(45) Date of Patent: Mar. 13, 2012

(54) GRAPHICAL MESSAGE FORMAT BUILDER

(75) Inventors: Mihai Cristian Birloncea, Richmond Hill (CA); Shelley Lau, Scarborough (CA); Martin Leclerc, Toronto (CA); Alfred Chun Yang, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 10/907,008

(22) Filed: Mar. 16, 2005

(65) Prior Publication Data
US 2006/0212787 A1 Sep. 21, 2006

(51) Int. Cl.
*G06F 9/44* (2006.01)
*G06F 3/048* (2006.01)

(52) U.S. Cl. ......... 719/313; 715/763; 715/769; 715/810

(58) Field of Classification Search .................. 715/222, 715/223, 762–765, 769, 249, 731, 810, 826; 719/313–315; 717/105
See application file for complete search history.

(56) References Cited

U.S. PATENT DOCUMENTS

| | | | | |
|---|---|---|---|---|
| 4,680,705 A | 7/1987 | Shu | .............................. | 364/300 |
| 4,885,717 A * | 12/1989 | Beck et al. | .................... | 717/125 |
| 6,105,062 A | 8/2000 | Andrews et al. | .............. | 709/223 |
| 6,219,826 B1 * | 4/2001 | De Pauw et al. | .............. | 717/116 |
| 6,499,036 B1 | 12/2002 | Gurevich | .................. | 707/103 R |
| 6,836,890 B1 * | 12/2004 | Watts et al. | ..................... | 719/313 |
| 6,961,708 B1 * | 11/2005 | Bierenbaum | ...................... | 705/8 |
| 7,093,264 B2 * | 8/2006 | Choi et al. | ..................... | 719/316 |
| 7,340,745 B2 * | 3/2008 | Waldorf | ........................ | 719/328 |
| 2002/0054155 A1 * | 5/2002 | Churchill et al. | ............. | 345/826 |
| 2002/0154177 A1 | 10/2002 | Barksdale et al. | ............. | 345/853 |
| 2004/0034497 A1 * | 2/2004 | Shah et al. | ..................... | 702/127 |

FOREIGN PATENT DOCUMENTS

| | | |
|---|---|---|
| EP | 0 449 500 A2 | 10/1991 |
| EP | 1 107 126 A2 | 6/2001 |

OTHER PUBLICATIONS

IBM Technical Disclosure Bulletin, "Object-Tree Within a Pie Menu", Jul. 1990, 1 page.
IBM Research Disclosure Bulletin 449155, No. 449, Article 155, "Language for Message Transformation", Sep. 2001, pp. 1602-1604.

* cited by examiner

*Primary Examiner* — Charles E Anya
(74) *Attorney, Agent, or Firm* — Steven M. Greenberg, Esq.; Carey, Rodriguez, Greenberg & O'Keefe

(57) ABSTRACT

A graphical message format builder facilitates a user in building message formats by using format elements from a format editor palette which are inserted into a message format definition in a graphical editing pane. Each format element is served as a building block of a message format which in turn is used to construct the message. A format hierarchy view allows a visualization of the data mapping to the message format to be seen.

27 Claims, 8 Drawing Sheets

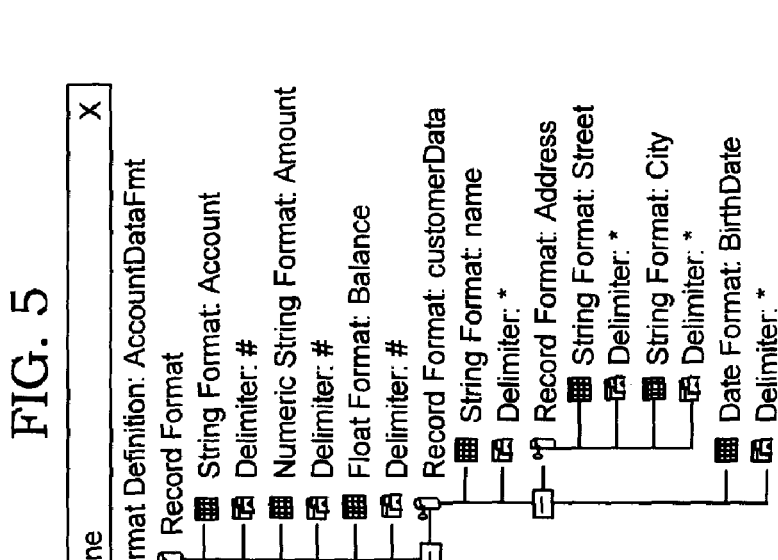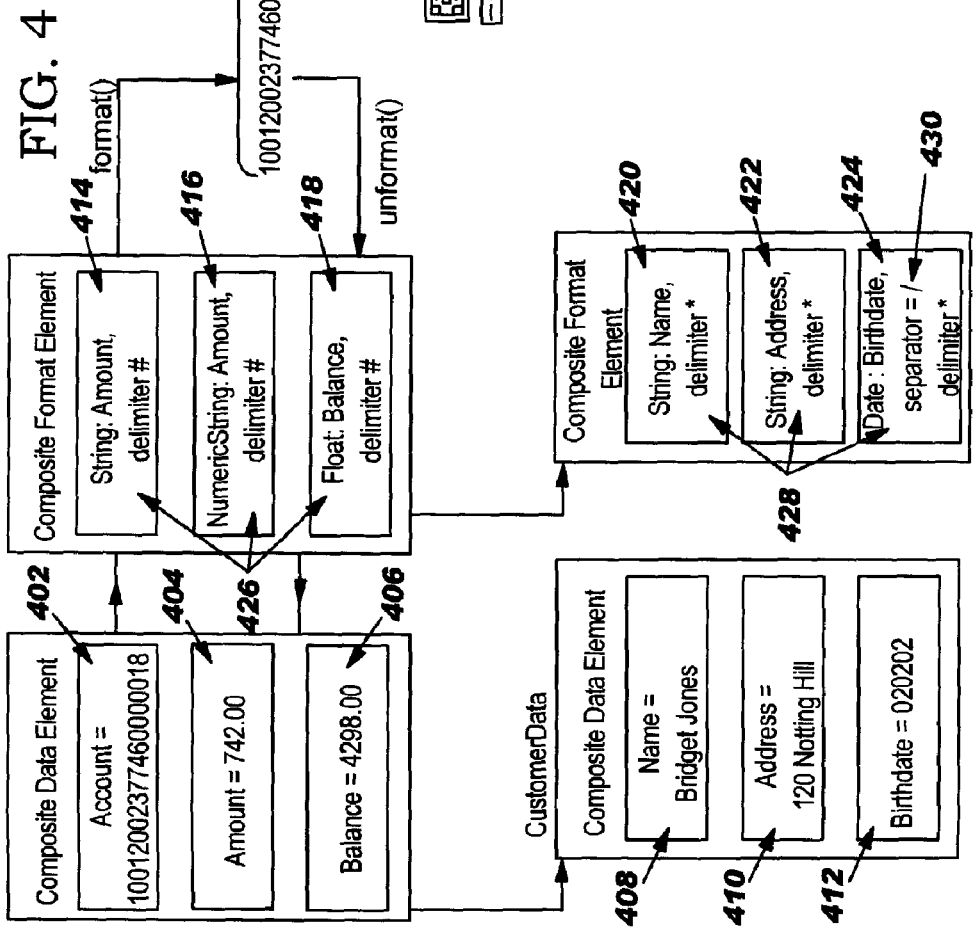

GRAPHICAL MESSAGE FORMAT BUILDER

BACKGROUND OF THE INVENTION

The present invention relates to a graphical message format builder, and more particularly, to a graphical representation of the physical appearance of a formatted message and a message format builder that uses formatting tools that allow the message format to be built and edited.

A message integrator enables application integration by helping business applications to exchange information across different platforms. One example of a message integrator is the IBM® MQSeries® Integrator (IBM and MQSeries are trademarks of International Business Machines Corporation in the United States, other countries, or both). MQSeries Integrator is an information broker that selects and distributes information to the applications, databases, and people that need it. Users can implement real-time, application-to-application message transformation and intelligent message routing. Using MQSeries Integrator to deliver messages, MQSeries Integration enhances the capability of the MQSeries network by orchestrating the flow of information based on policies or business rules. MQSeries Integration enriches and transforms data, dynamically routing it in the format required by the recipient.

Data interoperability in the business integration solution or distributed computing environment is resolved by converting between proprietary and standard message structure and representation and vice versa. A message broker like MQSeries Integrator is capable of transforming messages based on a set of rules.

The rules are called formats, which describe the structure and encoding of the data into a certain structure within a message. The rules are utilized by some transformation engines within a message processing system to parse and construct messages. The formats include basic data manipulation such as padding, truncation, alignment, numeric format, etc.

BRIEF SUMMARY OF THE INVENTION

According to a first aspect of the present invention, a method for graphically building a message format comprises receiving at least one message element, building a message format using the at least one message element, and graphically representing a physical appearance of a formatted message.

According to another aspect of the present invention, an apparatus for graphically building a message format comprises means for receiving at least one message element, means for building a message format using the at least one message element and means for graphically representing a physical appearance of a formatted message.

According to yet another aspect of the present invention, a computer program product for graphically building a message format comprises a computer readable medium having computer readable program code embodied therein. The computer readable program code comprises computer readable program code configured to receive at least one message element, computer readable program code configured to build a message format using the at least one message element and computer readable program code configured to represent graphically a physical appearance of a formatted message.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 4 is a diagram illustrating composite data being converted into a string message;

FIG. 5 is a diagram illustrating the nested structure of a message format in conventional tree view;

DETAILED DESCRIPTION OF THE INVENTION

Figure 1:
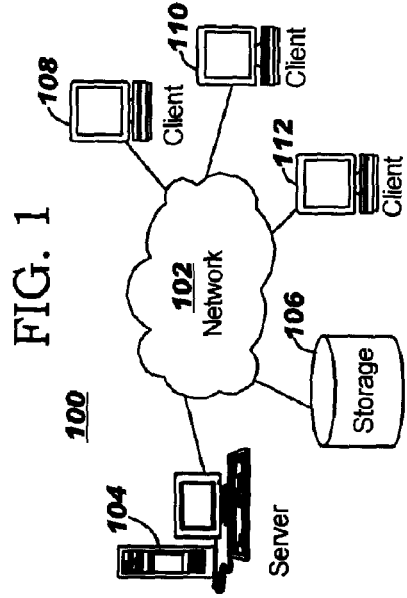
FIG. 1 is a pictorial representation of a network of data processing systems in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
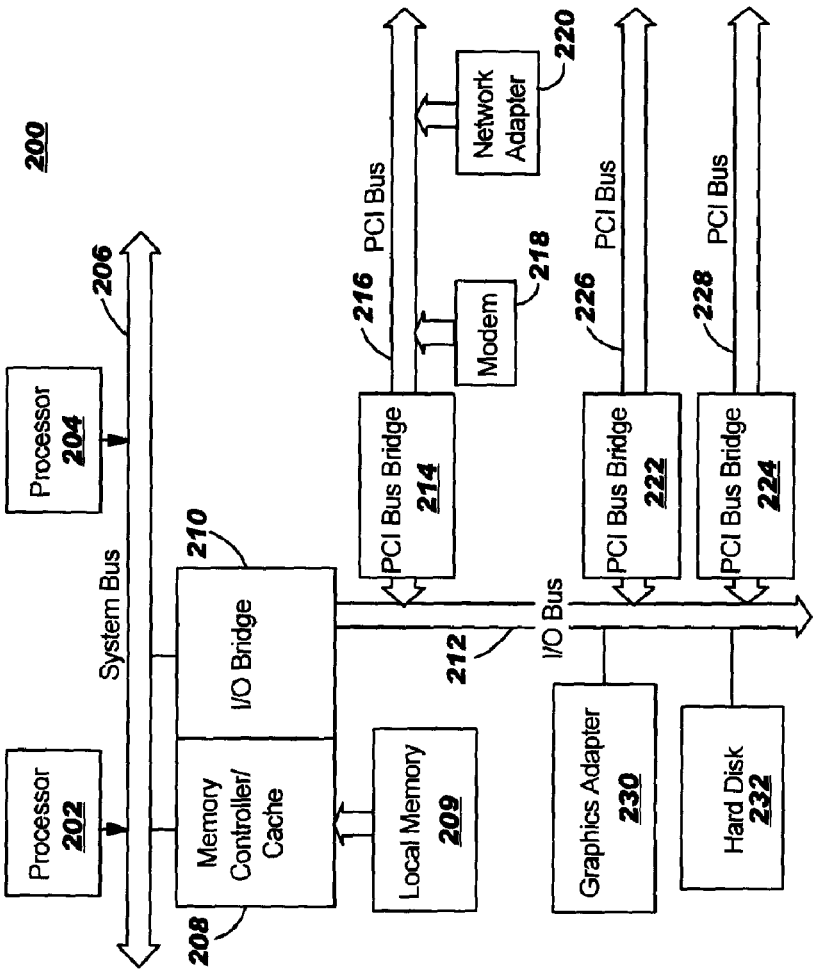
FIG. 2 is a block diagram of a data processing system that may be implemented as a server in accordance with an aspect of the present invention.
Figure 3:
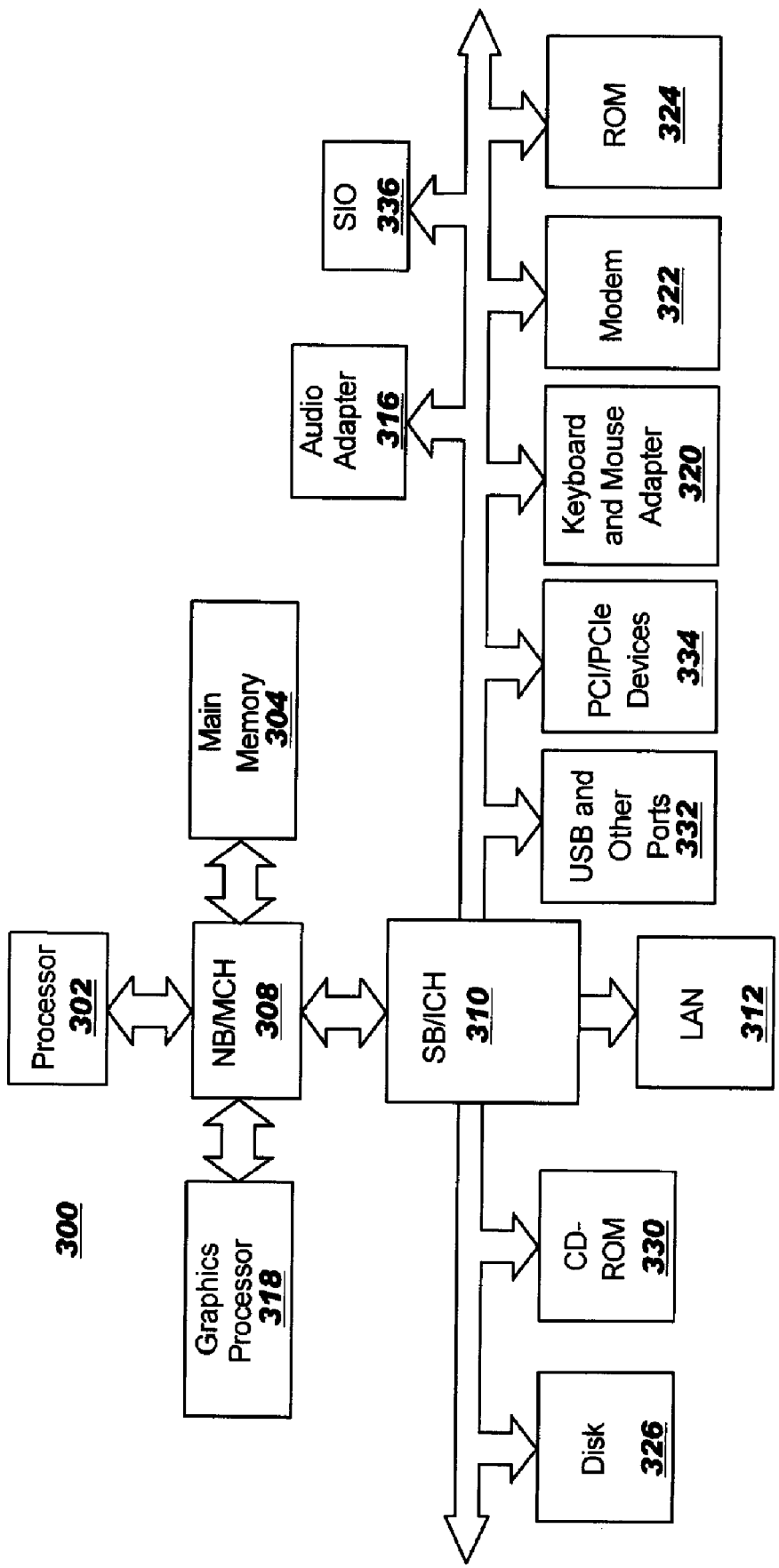
FIG. 3 is a block diagram of a data processing system in which the present invention may be implemented.

The present invention provides a method, apparatus, and computer program product for providing a graphical representation of the physical appearance of a formatted message and a message format builder, which uses formatting tools that allow a message format to be built and edited. FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with an aspect of the present invention, server 104 provides application integration tools to application developers for applications that are used on clients 108, 110, 112. More particularly, server 104 may provide access to application integration tools that will allow two different front-end applications in two different formats to disseminate messages sent from each other.

In accordance with one aspect of the present invention, a dynamic framework is provided for using a graphical user interface (GUI) for creating and editing message formats. This framework involves the development of user interface (UI) components for message data elements in the visualization and building of message formats, which may exist on storage 106. This framework may be provided through an editor mechanism on server 104 in the depicted example. The UI components and message data elements may be accessed, for example, using a browser client application on one of clients 108, 110, 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an aspect of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/ cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data. A bus system may be comprised of one or more buses, such as system bus 206, I/O bus 212 and PCI buses 216, 226 and 228 as shown in FIG. 2. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

FIG. 4 depicts a simple example of composite data being converted into a string message. In the depicted example, data elements 402, 404, 406, 408, 410 and 412 are transmitted from clients 108, 110 and 112 of FIG. 1. Prior to transmission, the data elements are parsed into their format elements 414, 416, 418, 420, 422 and 424 and delimited by delimiters 426 and 428 and separator 430 to create a string message 432.

FIG. 5 depicts a message format in a nested structure of a conventional tree view. In this depiction of a message format, the format elements depicted are separated by a delimiter. Though this tree view shows the format elements of the string message, the view does not provide a physical appearance of the string as it would appear prior to or after parsing. Also, additions to the format of the message may only be made through use of drop down menus to select elements to be added. Deletions are made by highlighting existing elements and choosing a delete function from a drop down menu. Modification of an id or other format attribute may be made in the editor properties view.

Figure 6:
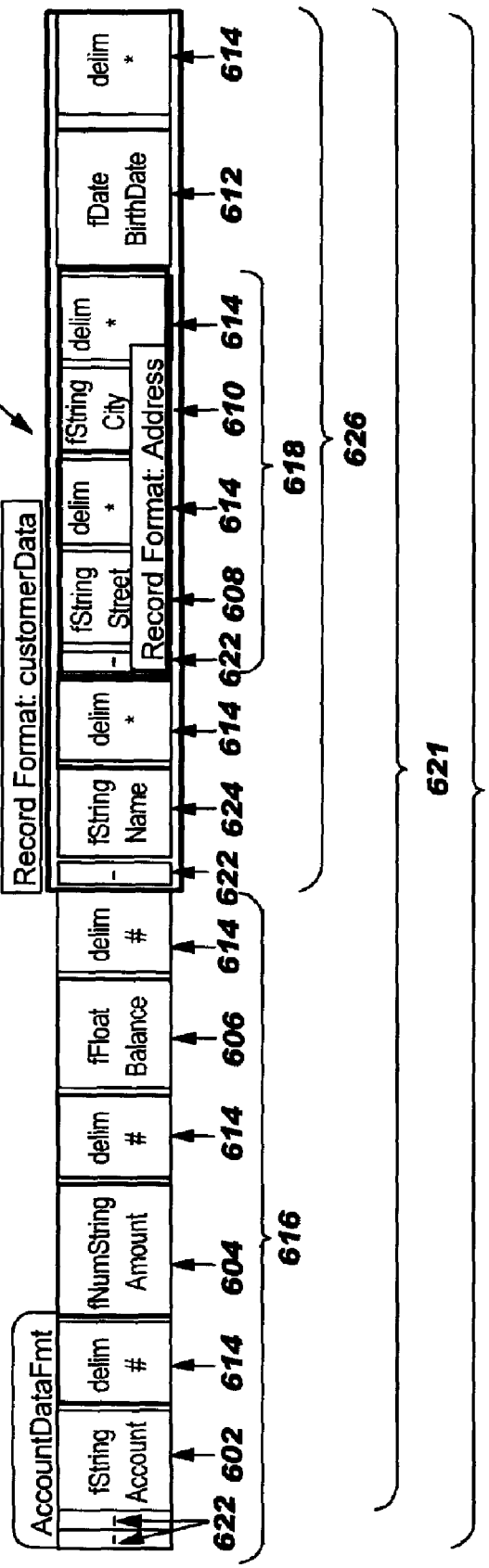
FIG. 6 is a diagram illustrating a graphical representation and the nested structure of a message format in accordance with an aspect of the present invention.

FIG. 6 depicts a graphical representation of a message format in accordance with an aspect of the present invention. In this depiction, message format 600 contains format elements 602, 604, 606, 608, 610, 612 and 624 which are shown delimited by delimiters 614 in a horizontal view as they would appear in the actual message string.

The horizontal bar is used and each format element is shown in sequential order, in a format definition to convey the horizontal or linear characteristic of a formatted string and the order in which the formats are to be applied. This graphical representation of the physical appearance of the message format 600 does not neglect the details of the nested structure of the original data.

The nested structure of a message format 600 is shown by grouping into expandable accordion style containers 618, 620, 621 and 626. Container 618 shows the sub-compound format element, which is the record format Address, in its parent format element, which is record format customerData of container 626. The same nested structure is shown vertically in a conventional tree in FIG. 5. Top container 621 is comprised of element 602, 604 and 606 as shown in 616 along with container 626. The containers 618, 620, 621 and 626 are expandable and collapsible horizontally by using the collapsible/expandable toggle 622. When all containers are expanded, one may visualize the message format 600 with values substituted into each data field. However, the accordion style containers 618, 620 and 626 may be collapsed to hide the next level in depth in order to simplify the view and minimize the number of levels being displayed at a time.

Figure 7:
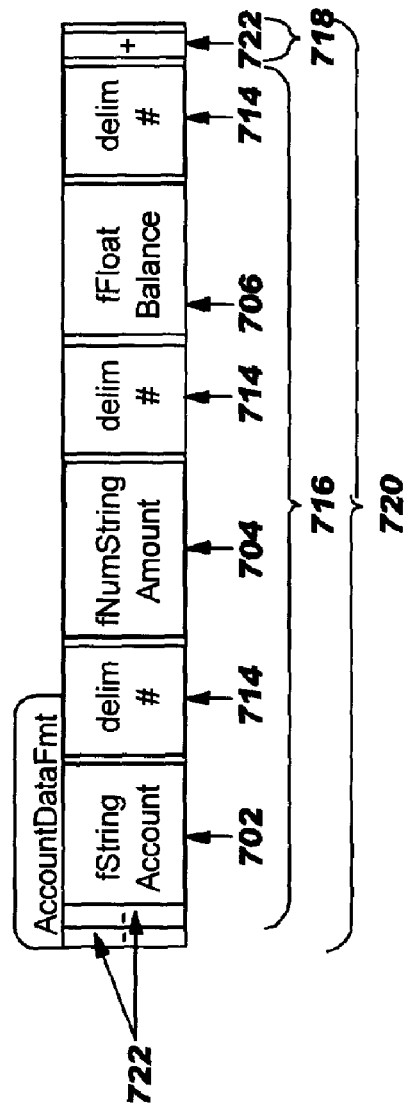
FIG. 7 is a diagram illustrating a single level of the nested format structure in the horizontal view in accordance with an aspect of the present invention.

FIG. 7 depicts a single level of the nested structure in the horizontal view in accordance with an aspect of the present invention. In this depiction, message format 700 contains format elements 702, 704, and 706 which are shown delimited by delimiters 714 in a horizontal view as they would appear in the actual message string. This graphical representation of the physical appearance of message format 700 does not neglect the details of the nested structure of the original data. The collapsed nested structure of message format 700 is shown by the collapsed toggle 722 indicating a "+" of container 718 being collapsed. The containers 716, 718 and 720 are expandable and collapsible horizontally by using the collapsible/expandable toggle 722.

Figure 8:
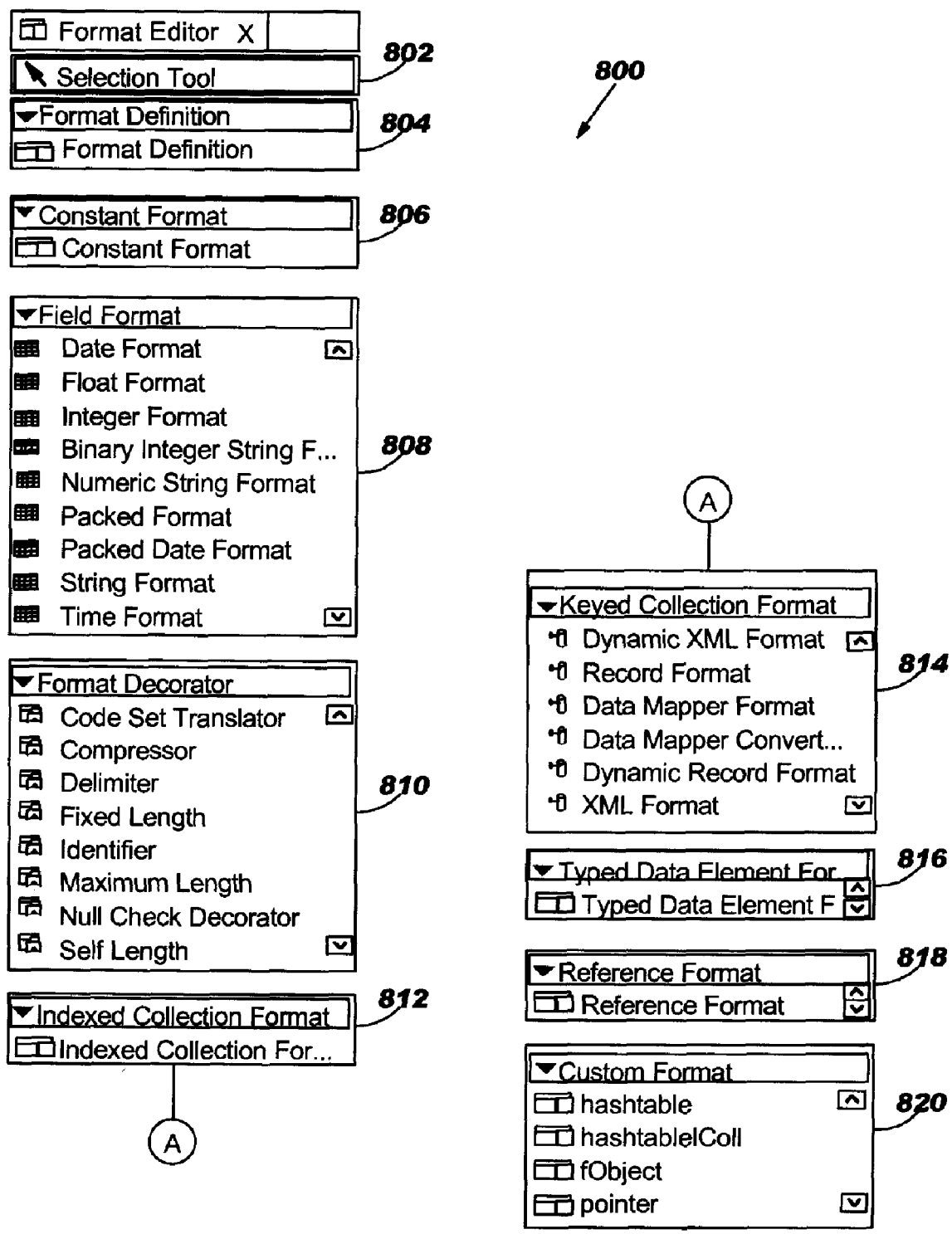
FIG. 8 is a diagram illustrating a format editor menu in accordance with an aspect of the present invention.

FIG. 8 depicts a format editor palette in accordance with an aspect of the present invention. Palette 800 provides a selection list of format elements to users for the creation and modification of message formats. Palette 800 provides, for example, a selection tool 802, and drop down selection submenus of format elements: format definition 804, constant format 806, field format 808, format decorator 810, indexed collection format 812, keyed collection format 814, typed data element format 816, reference format 818 and custom format 820. These tools and submenus are provided as examples, although more or fewer tools, menus and elements may be used depending on the implementation.

Selection tool 802 is provided to the user in order that the user indicates the selection of an element within submenus 804-820. The selection tool prevents elements from being selected in the event that an errant mouse click is issued on one of the submenu 804-820 elements. The format definition submenu 804 contains format definitions that allow a user to create a placeholder for defining message format. The constant format submenu 806 contains constant format elements that allow a user to apply a constant value within the message format. The constant value may be any string. The constant format does not handle any data elements.

The field format submenu 808 contains a selection of field elements that may be applied within the message format, for example a date field, integer field string field or time field. The format decorator submenu 810 contains decorator elements that allow the user to apply, for example, a delimiter, a fixed length or a null check to the message format.

The indexed collection format submenu 812 contains format elements that allow a user to apply formatting to simple or compound data. The keyed collection format submenu 814 contains collection elements that allow the user to apply formatting to a compound data. The typed data element format submenu 816 contains format elements that allow a user to apply conversion or mapping to the message format.

The reference format submenu 818 contains elements that may be applied to a message format to reference other messages formats that exist and are included within the instant message format schema. The custom format submenu 820 contains elements that are custom defined by the user. All of the elements and submenus are examples that may be available, although more or fewer submenus and elements may be used depending on the implementation.

Figure 9:
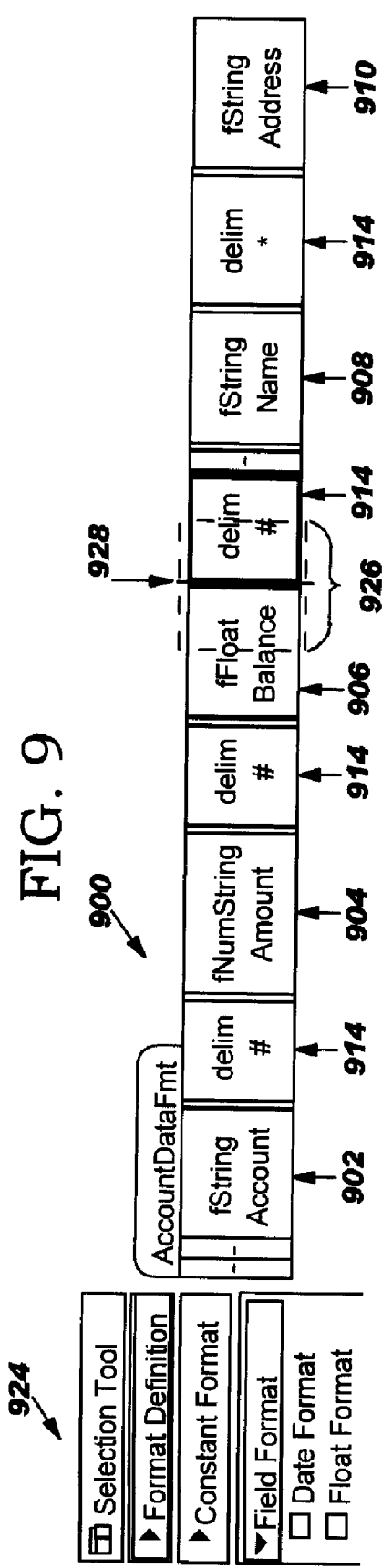
FIG. 9 is a diagram illustrating a message format builder using formatting tools that allows the message format to be built and edited in accordance with an aspect of the present invention.

In accordance with an aspect of the present invention, FIG. 9 depicts a message format builder that uses formatting tools that allow message format 900 to be easily built and edited using the graphical representation of the message formats of FIGS. 6 and 7 and the format editor palette of FIG. 8. In this depiction, message format 900 contains format elements 902, 904, 906, 908 and 910 which are shown delimited by delimiters 914 in a horizontal view as they would appear in the actual message string. In addition, a format editor palette 924 which provides a selection list of format elements to users for the creation and modification of the message format 900. To build a message format, users can drag-and-drop a format element from the selection list on format editor palette 924. The format elements may be selected from the format editor palette 924 on the left hand side and inserted graphically into the message format 900. This is shown as a format element 926 is being inserted into message format 900 at the desired position 928 between format element 906 and delimiter 914. Once format element 926 is dropped or inserted into the desired position 928 of message format 900, the format elements 902, 904, 906, 908, 910 and 926 may be reordered. Also, typical editing functions such as delete, undo and redo may be supported by the message format builder.

Figure 10:
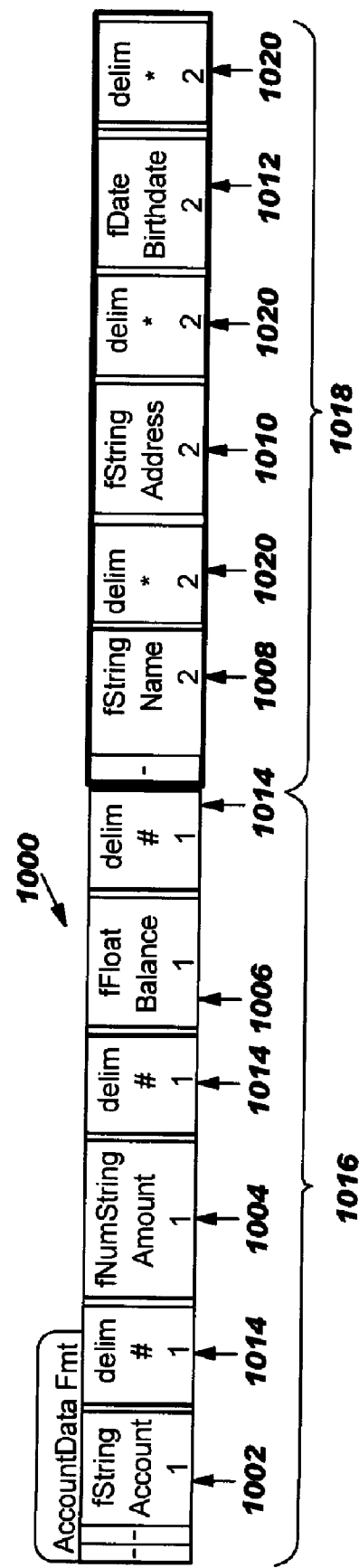
FIG. 10 is a diagram illustrating a message format builder that allows copying a nested structure of a message from one format definition to another in accordance with an aspect of the present invention.

In accordance with an aspect of the present invention, FIG. 10 depicts a message format builder that allows copying the whole or part of the nested structure of a message from one format definition and inserting to another seamlessly. In this depiction, message format 1000 contains message container 1016 composed of format elements 1002, 1004 and 1006. Format elements 1002, 1004 and 1006 are shown delimited by delimiters 1014 in a horizontal view as they would appear in the actual message string. It is a very common scenario that a message format is reused in different places. In FIG. 10, message container 1018 composed of format elements 1008, 1010 and 1012 is shown delimited by delimiters 1020. Message container 1018 is copied and pasted into message format 1000.

Figure 11:
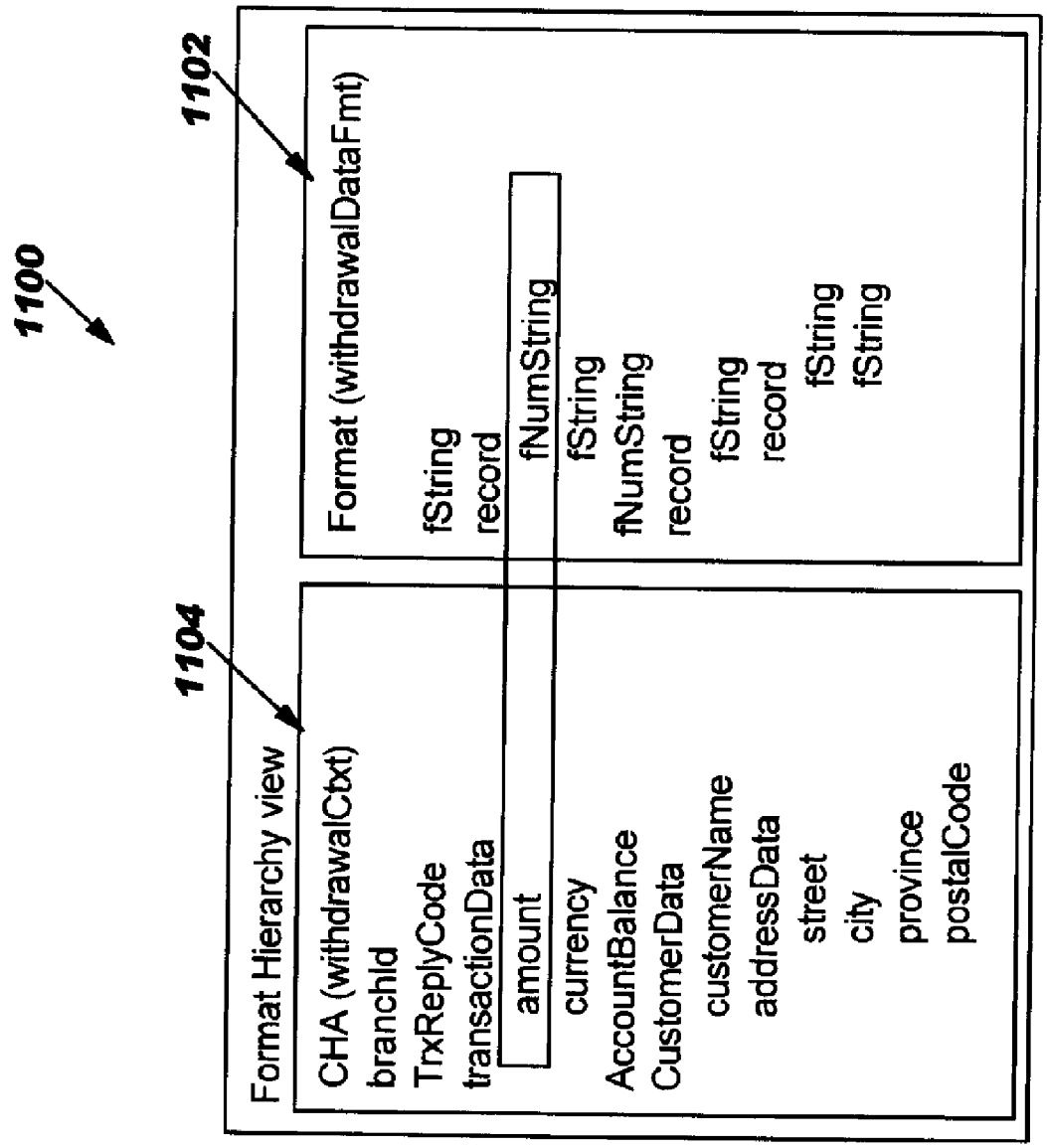
FIG. 11 is a diagram illustrating a format hierarchy view in support of the visualization of the data mapping from a newly built message format to data in accordance with an aspect of the present invention.

FIG. 11 depicts a format hierarchy view in support of the visualization of the data mapping from a newly built message format to data in accordance with an aspect of the present invention. In this depiction, format hierarchy 1100 contains a tree view of the message format 1102 and a data mapping 1104. This type of data mapping captures the relationship of data mapping by displaying the data in data mapping 1104 and the format structure in message format 1102 simultaneously side-by-side in a dual-tree-view. For those data fields that are ignored in the data transformation, no format is specified. In order to align the data field with the right format element, a blank would be inserted. Additionally, the format hierarchy is refreshed to show the whole format structure based on the user selection. When users select a sub-element in one message format, the user selection is updated in the Format Hierarchical view as well.

Figure 12:
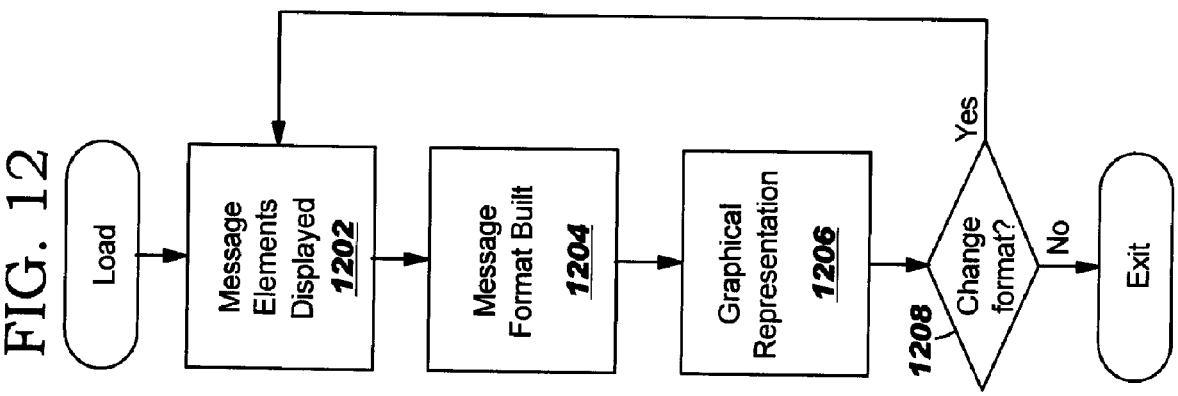
FIG. 12 is a flow diagram illustrating the operation of the graphical message formatting process in accordance with an aspect of the present invention.

Turning now to FIG. 12, a flow diagram 1200 illustrating the operation of the graphical message formatting process is depicted in accordance with an aspect of the present invention. The process begins with loading a message format definition schema (from a file). If there are existing message formats, they are displayed within the message format building application (block 1202). If the file contains no message format definition, the editing area within the building application is empty. To define and add a new message format, the user selects format definition element from the palette by dragging and dropping the element to the editing area. The user is able to select the desired elements from a format editor palette consisting of the elements described with respect to FIG. 8. Once the element is selected from the palette, it is placed in a message format at a location desired by the user (block 1204). The placement of the message elements into the message format results in a graphical representation of the message format, which correlates to a message string (block 1206). At block 1208, the user may choose to change the message format. If so, the process returns to block 1202 otherwise the process exits. Before the user exits the application, the user may choose to save the newly defined message formats or the modifications in the definition schema. The changes will be saved to the definition file.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for graphically building a message format, the method comprising:
receiving a message;
extracting at least one format element from the message;
building the message format using the at least one format element;
graphically representing a physical appearance of the message format in a horizontal format, wherein the horizontal format comprises an accordion style container of format elements, wherein the accordion style container include plurality of sub-containers, wherein each sub-container is delimited on both sides of the horizontal format of the sub-container, and wherein the accordion style container are expandable and collapsible in a horizontal direction;
expanding the accordion style containers or sub containers; and
in response to the expanding, substituting each data field of the accordion style container or sub containers with a value.

2. The method of claim 1, further comprising:
receiving a string message; and
graphically representing a physical appearance of the string message using the message format.

3. The method of claim 1, further comprising:
receiving the at least one format element from a format editor palette.

4. The method of claim 2, wherein the format editor palette comprises:
a selection tool; and
submenus of format elements, wherein the format elements include a plurality of the at least one format element.

5. The method of claim 4, wherein the submenus comprise at least one of a format definition, constant format submenu, field format submenu, format decorator submenu, indexed collection format submenu, keyed collection format submenu, typed data element format submenu, reference format submenu, or a custom format submenu.

6. The method of claim 1, wherein building the message format comprises at least one of:
inserting the at least one format element into the message format;
moving the at least one format element within the message format; or
deleting the at least one format element from the message format.

7. The method of claim 1, wherein building the message format comprises:
copying at least a portion of an existing message format; and
pasting the at least a portion of the existing message format into the message format.

8. The method of claim 1, wherein building the message format comprises:
referencing existing message formats within the message format.

9. The method of claim 1, further comprising:
providing a format hierarchy view, wherein the format hierarchy view provides visualization of data mapping in relation to the message format.

10. A data processing system comprising:
a bus system;
a communications unit connected to the bus system;
a memory connected to the bus system, wherein the memory includes a set of instructions; and a processing unit connected to the bus system, wherein the processing unit executes the set of instructions to
receive a message;
extract at least one format element from the message;
build a message format using the at least one format element;
graphically represent a physical appearance of the message format in a horizontal format, wherein the horizontal format comprises an accordion style container of format elements, wherein the accordion style container include plurality of sub-containers, wherein each sub-container is delimited on both sides of the horizontal format of the sub-container, and wherein the accordion style container are expandable and collapsible in a horizontal direction;
expand the accordion style containers or sub containers; and
in response to the expanding, substitute each data field of the accordion style container or sub containers with a value.

11. The data processing system of claim 10, wherein the processing unit further executes a set of instructions to receive a string message, and graphically represent a physical appearance of the string message using the message format.

12. The data processing system of claim 10, wherein the set of instructions further comprises:
instructions to receive the at least one format element from a format editor palette.

13. The data processing system of claim 12, wherein the set of instructions to receive the at least one format element from a format editor palette comprises:
a set of instructions to provide a selection tool, and provide submenus of format elements, wherein the format elements include a plurality of the at least one format element.

14. The data processing system of claim 13, wherein the submenus comprise at least one of a format definition, constant format submenu, field format submenu, format decorator submenu, indexed collection format submenu, keyed collection format submenu, typed data element format submenu, reference format submenu, or a custom format submenu.

15. The data processing system of claim 10, wherein the set of instructions to build the message format using the at least one format element comprises at least one of:
a set of instructions to insert the at least one format element into the message format;
a set of instructions to move the at least one format element within the message format;
or a set of instructions to delete the at least one format element from the message format.

16. The data processing system of claim 10, wherein the set of instructions to build the message format using the at least one format element comprises:
a set of instructions to copy at least a portion of an existing message format, and paste the at least a portion of the existing message format into the message format.

17. The data processing system of claim 10, wherein the set of instructions to build the message format using the at least one format element comprises:
a set of instructions to reference existing message formats within the message format.

18. The data processing system of claim 10, wherein the processing unit further executes a set of instructions to provide a format hierarchy view, wherein the format hierarchy view provides visualization of data mapping in relation to the message format.

19. A computer program product comprising a non-transitory computer-readable storage medium having stored therein instructions for graphically building a message format, the instructions, when executed on a computer, instruct the computer to perform the operations comprising:
receiving a message;
extracting at least one format element from the message;
building the message format using the at least one format element;
graphically representing a physical appearance of the message format in a horizontal format, wherein the horizontal format comprises an accordion style container of format elements, wherein the accordion style container include plurality of sub-containers, wherein each sub-container is delimited on both sides of the horizontal format of the sub-container, and wherein the accordion style container are expandable and collapsible in a horizontal direction;
expanding the accordion style containers or sub containers; and
in response to the expanding, substituting each data field of the accordion style container or sub containers with a value.

20. The computer program product of claim 19, further comprising:
receiving a string message; and
graphically representing a physical appearance of the string message using the message format.

21. The computer program product of claim 19, further comprising
receiving at least one format element from a format editor palette.

22. The computer program product of claim 21, wherein the format editor palette comprises:
a selection tool; and
submenus of format elements, wherein the format elements include a plurality of the at least one format element.

23. The computer program product of claim 22, wherein the submenus comprise at least one of a format definition, constant format submenu, field format submenu, format decorator submenu, indexed collection format submenu, keyed collection format submenu, typed data element format submenu, reference format submenu, or a custom format submenu.

24. The computer program product of claim 19, wherein building the message format comprises at least one of:
inserting the at least one format element into the message format;
moving the at least one format element within the message format;
or deleting the at least one format element from the message format.

25. The computer program product of claim 19, wherein building the message format comprises:
copying at least a portion of an existing message format; and
pasting the at least a portion of the existing message format into the message format.

26. The computer program product of claim 19, wherein building the message format comprises:
referencing existing message formats within the message format.

27. The computer program product of claim 19, further comprising:
providing a format hierarchy view, wherein the format hierarchy view provides visualization of data mapping in relation to the message format.

* * * * *